United States Patent
Hallak et al.

(10) Patent No.: US 8,705,214 B2
(45) Date of Patent: Apr. 22, 2014

(54) CIRCUIT ARRANGEMENT COMPRISING AT LEAST TWO CAPACITORS CONNECTED IN SERIES

(75) Inventors: Jalal Hallak, Vienna (AT); Harald Kernstock, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 977 days.

(21) Appl. No.: 12/598,936

(22) PCT Filed: Apr. 15, 2008

(86) PCT No.: PCT/EP2008/054537
§ 371 (c)(1),
(2), (4) Date: Nov. 5, 2009

(87) PCT Pub. No.: WO2008/138699
PCT Pub. Date: Nov. 20, 2008

(65) Prior Publication Data
US 2010/0085667 A1 Apr. 8, 2010

(30) Foreign Application Priority Data

May 10, 2007 (AT) .................................. A 717/2007

(51) Int. Cl.
*H02H 7/16* (2006.01)
(52) U.S. Cl.
USPC ......................................................... 361/16

(58) Field of Classification Search
USPC ........................................................... 361/16
See application file for complete search history.

(56) References Cited

U.S. PATENT DOCUMENTS

| 4,568,871 A | 2/1986 | Bauman |
| 4,975,796 A | 12/1990 | MacDougall |
| 6,813,172 B2 * | 11/2004 | Park .......................... 363/56.12 |
| 2005/0280968 A1 | 12/2005 | Grundmann |

FOREIGN PATENT DOCUMENTS

| CA | 1158711 A | * | 12/1983 |
| JP | 6302474 A | | 10/1994 |
| JP | 06302474 A | * | 10/1994 |
| JP | 9224368 A | | 8/1997 |
| RU | 2275726 C1 | | 4/2006 |

* cited by examiner

Primary Examiner — Rexford Barnie
Assistant Examiner — Ann Hoang

(57) ABSTRACT

A circuit arrangement including at least two capacitors that are connected in series to a voltage is provided. The circuit arrangement also includes a voltage divider, arranged in parallel to the at least two capacitors, the voltage divider divides the voltage to the at least two capacitors, and a protective diode arranged in parallel to every capacitor in series to a series resistance in such a manner that the threshold voltage of the protective diode is lower than the admissible voltage of the capacitor arranged in parallel to the protective diode. In addition a protective circuit is arranged in parallel to the series resistances.

14 Claims, 3 Drawing Sheets

CIRCUIT ARRANGEMENT COMPRISING AT LEAST TWO CAPACITORS CONNECTED IN SERIES

CROSS REFERENCE TO RELATED APPLICATIONS

This application is the US National Stage of International Application No. PCT/EP2008/054537, filed Apr. 15, 2008 and claims the benefit thereof The International Application claims the benefits of Austrian application No. A717/2007 AT filed May 10, 2007, both of the applications are incorporated by reference herein in their entirety.

FIELD OF INVENTION

The invention relates to a circuit arrangement comprising at least two capacitors connected in series to a voltage, a voltage divider being arranged parallel to the at least two capacitors, which divides the voltage between the at least two capacitors.

BACKGROUND OF INVENTION

According to the prior art capacitors are connected in series if the voltage to be applied is greater than the permissible voltage of an individual capacitor. Electrolytic capacitors (ELKO) are available in sizes up to approx. 500 V rated voltage for example. Therefore for applications which provide for the storage of electrical energy in electrolytic capacitors with voltages above 500 V, two or more electrolytic capacitors have to be connected in series.

It is known for example to use a number of input capacitors for inverters, which are used to feed electrical energy from alternative power sources into a power network. With solar generators in particular high voltages occur at the input of the inverter, for which reason a series circuit of a number of electrolytic capacitors is generally provided for input-side energy buffering.

To divide the input voltage present evenly between a number of capacitors, according to the prior art a voltage divider is arranged parallel to the capacitors. In the simplest instance the voltage divider consists of high-impedance resistances, with a resistance being connected parallel to each capacitor.

Such series circuits comprising a number of capacitors have the disadvantage that the desired voltage limiting for the individual capacitors fails when a fault occurs, during which a capacitor short circuits. The shorting of a capacitor necessarily results in the input voltage then being divided between the remaining unshorted capacitors.

This problem is resolved in the known manner by overdimensioning the capacitor circuit. Therefore for example additional capacitors are arranged to compensate for the failure or shorting of individual capacitors. This has the disadvantage of increasing component costs and the need to provide an additional circuit indicating the failure of a capacitor.

Another known measure for protecting capacitors is the arrangement of fuses in the current path of each individual capacitor. In the event of a short circuit the blown fuse interrupts the current flow and the remaining capacitors are not charged further. Before resuming operation, the fuse must be changed and the cause of the short circuit must be eliminated.

SUMMARY OF INVENTION

The object of the invention is to specify an improvement compared with the prior art for a circuit arrangement of the type mentioned in the introduction.

According to the invention this object is achieved by a circuit arrangement with at least two capacitors connected in series to a voltage, a voltage divider being arranged parallel to the at least two capacitors, which divides the voltage between the at least two capacitors, with a protective diode in series with a series resistance also being arranged parallel to each capacitor in such a manner that the threshold voltage of the protective diode is less than the permissible voltage of the capacitor arranged parallel to the protective diode and with a protective circuit being arranged parallel to the series resistances.

This arrangement should be realized with simple components. The specifically provided protective circuit, which is arranged parallel to the series resistances, protects the capacitors as soon as a partial voltage at one of the capacitors exceeds the threshold voltage of the protective diode arranged parallel to the capacitor and a voltage is thus present at the corresponding series resistance. To this end the protective circuit for example comprises a facility for isolating the capacitors, which in the simplest instance is configured as a switching element at the input of the capacitor circuit. In another embodiment the protective circuit comprises a capacitor, which is connected to the remaining capacitors if required.

It is advantageous if the protective circuit comprises at least one coupling element with a transmit part and a receiver part, which couples the series resistances to an alarm circuit in such a manner that a voltage present at a series resistance triggers activation of the alarm circuit. The alarm circuit then uses a lower voltage level than the capacitor circuit and can be integrated in a control circuit of a device containing the capacitor circuit. Electrical isolation between the transmit part and receiver part of the at least one coupling element also increases the safety of the device.

In a simple such embodiment the alarm circuit comprises a facility for isolating the at least two capacitors and the isolating facility is connected in series with the receiver part of the at least one coupling element to an auxiliary voltage. In the event of a capacitor shorting, the coupling of the series resistance, to which voltage is then applied, to the alarm circuit causes the auxiliary voltage to be applied to the isolating facility by means of the receiver part of the at least one coupling element. The auxiliary voltage is then used for example as a control voltage for a switching element for isolating purposes.

In the case of an arrangement with a number of coupling elements between capacitor circuit and alarm circuit the receiver parts of the coupling elements are connected in parallel, with this parallel circuit being connected in series with the isolating facility to the auxiliary voltage. A signal transmission of each coupling element then results in the alarm circuit being activated.

In one advantageous embodiment of the invention at least two capacitors are connected in series to the voltage, a resistance is arranged parallel to each capacitor and a series circuit made up of a protective diode and a series resistance is connected parallel to each resistance and a transmit part of a coupling element is also arranged parallel to each series resistance. With this circuit it is possible to connect any number of capacitors in series without impairing the protective effect of the circuit.

For two capacitors connected in series a circuit is advantageous in which a first resistance in series with a first series resistance is arranged parallel to the first capacitor and a second resistance in series with a second series resistance is arranged parallel to the second capacitor and in which a first protective diode is arranged parallel to the first resistance and a second protective diode is arranged parallel to the second resistance and in which the transmit part of a coupling element is arranged parallel to the series circuit formed from the series resistances. Only one coupling element is thus necessary, this being used to couple both series resistances to the alarm circuit.

It is favorable if a Zener diode is arranged parallel to each series resistance to protect the transmit part of the at least one coupling element. The breakdown voltages of the Zener diodes here are below the permissible voltage of the at least one coupling element.

It is also favorable if a pre-resistance is connected upstream of the transmit part of the at least one coupling element. This pre-resistance can be used to limit the current through the transmit part of the at least one coupling element in the event of activation.

The protective diodes are advantageously embodied as suppressor diodes. These have a defined breakdown voltage as their threshold voltage as well as a very high discharge power and fast response behavior.

Configuration as an optical coupler is advantageous for the coupling elements. Optical couplers are proven structural elements, which ensure electrical isolation between a transmit part configured as a light-emitting diode and a receiver part configured as a phototransistor.

BRIEF DESCRIPTION OF THE DRAWINGS

The invention is described in an exemplary manner below with reference to the accompanying figures showing schematic diagrams, in which.

DETAILED DESCRIPTION OF INVENTION

Figure 1:
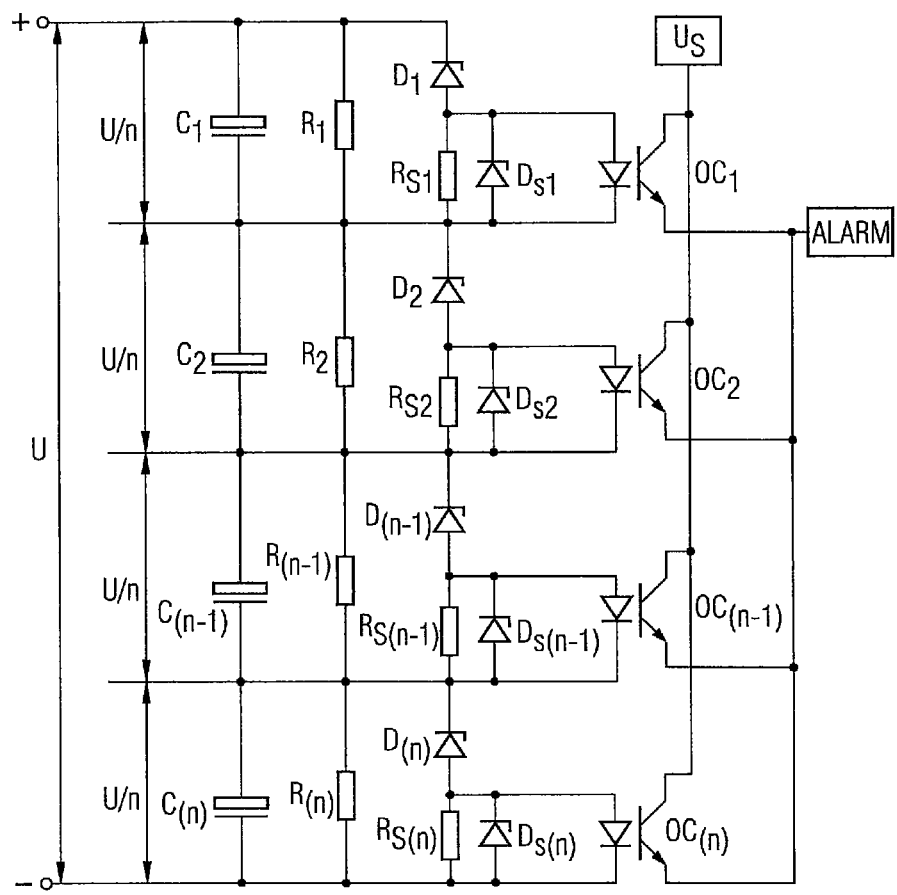
FIG. 1 shows a circuit arrangement with a number of capacitors arranged in series

FIG. 1 shows the embodiment of an inventive circuit arrangement with a number of capacitors $C_1 \ldots C_{(n)}$ arranged in series, with an index i=1 to n being assigned to each capacitor $C_i$ to simplify the description which follows. The number n of capacitors $C_1 \ldots C_{(n)}$ is a function here of the voltage U present, the rated voltages of the capacitors $C_1 \ldots C_{(n)}$ and the voltage division between the individual capacitors $C_1 \ldots C_{(n)}$.

The voltage division is predetermined by a voltage divider. In the simplest instance the voltage divider is formed, as shown in FIG. 1, from a number of resistances $R_1 \ldots R_{(n)}$, a resistance $R_i$ being connected parallel to each capacitor $C_i$. The voltage U is divided according to the resistance values between the individual capacitors $C_i$. Where the resistance values are the same, the same partial voltage U/n is present at each capacitor $C_i$.

A series circuit consisting of a protective diode $D_i$ and a series resistance $R_{Si}$ is connected parallel to each resistance $R_i$. The respective protective diode $D_i$ here has a threshold voltage, which is below the permissible voltage of the capacitor $C_i$ arranged in parallel. The protective diodes $D_i \ldots D_{(n)}$ here are preferably configured as suppressor diodes.

During fault-free operation the following applies for the partial voltages present at the capacitors $C_1 \ldots C_{(n)}$:

$$UC_1 = UC_2 = UC_{(n-1)} = UC_{(n)} = U_{max}/n$$

The following applies for the voltages at the protective diodes $D_1 \ldots D_{(n)}$:

$$UD_1 = UD_2 = UD_{(n-1)} = UD_{(n)} = UC_{(n)}$$

During fault-free operation there is no voltage present at the series resistances $R_{S1} \ldots R_{S(n)}$, as the voltages $UD_1 \ldots UD_{(n)}$ present at the protective diodes $D_1 \ldots D_{(n)}$ are lower than their threshold voltage. The protective circuit is arranged parallel to the series resistances $R_{Si} \ldots R_{S(n)}$.

The protective circuit shown in FIG. 1 comprises n coupling elements $OC_1 \ldots OC_n$, which are preferably configured as optical couplers. A transmit part (e.g. light-emitting diode) of a coupling element $OC_i$ is connected parallel to each series resistance $R_{Si}$ here. To protect the transmit parts against overvoltages a Zener diode $D_{S1}$ is also connected parallel to each series resistance $R_{Si}$ and this becomes conducting as soon as the voltage present at the transmit part reaches a permissible maximum value. The transmit parts are protected against overcurrents by means of pre-resistances $R_{V1} \ldots R_{Vn}$.

The receiver parts of the coupling elements $OC_1 \ldots OC_n$, (e.g. phototransistors) are connected in a parallel manner to an auxiliary voltage $U_s$ and a facility ALARM for isolating the capacitors $C_1 \ldots C_n$ from the voltage U initially present.

In the event of a fault, when a capacitor $C_i$ has short circuited, the voltage U initially present is divided between the remaining unshorted capacitors $C_i C_{(i-1)}, C_{(i+1)} \ldots C_{(n)}$. In this process the threshold voltage of the protective diodes $D_1 \ldots D_{(i+1)} \ldots D_{(n)}$ arranged parallel to said capacitors $C_1 \ldots C_{(i-1)}, C_{(i+1)} \ldots C_{(n)}$ is exceeded. The protective diodes $D_1 \ldots D_{(i-1)}, D_{(i+1)} \ldots D_{(n)}$ become conducting and at the series resistances $R_{S1} \ldots R_{S(i-1)}, R_{S(i+1)} \ldots R_{S(n)}$ a voltage builds up, which brings about activation of the alarm circuit by way of the coupling elements $OC_1 \ldots OC_{(i-1)}$, $OC_{(i+1)} \ldots OC_{(n)}$ to isolate the capacitors $C_i \ldots C_{(n)}$.

Figure 2:
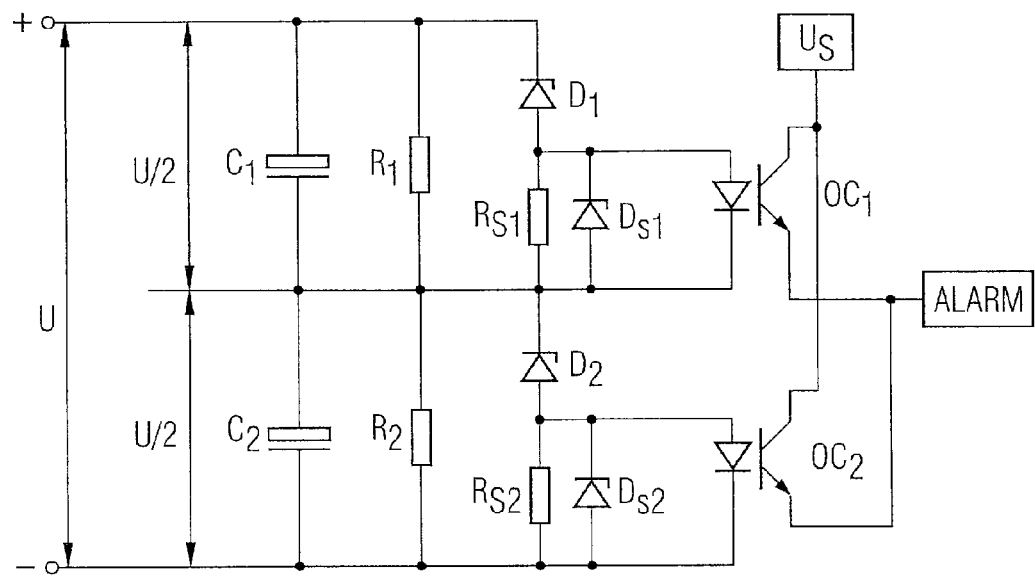
FIG. 2 shows a circuit arrangement with two capacitors arranged in series and two coupling elements

FIG. 2 shows a circuit arrangement of identical embodiment with only two capacitors $C_1, C_2$ connected in series. In the event of a fault, i.e. when a capacitor $C_1$ or $C_2$ short circuits, the entire voltage U initially present is present at the unshorted capacitor $C_2$ or $C_1$. The mode of operation of the protective circuit here corresponds to the one described with reference to FIG. 1.

Figure 3:
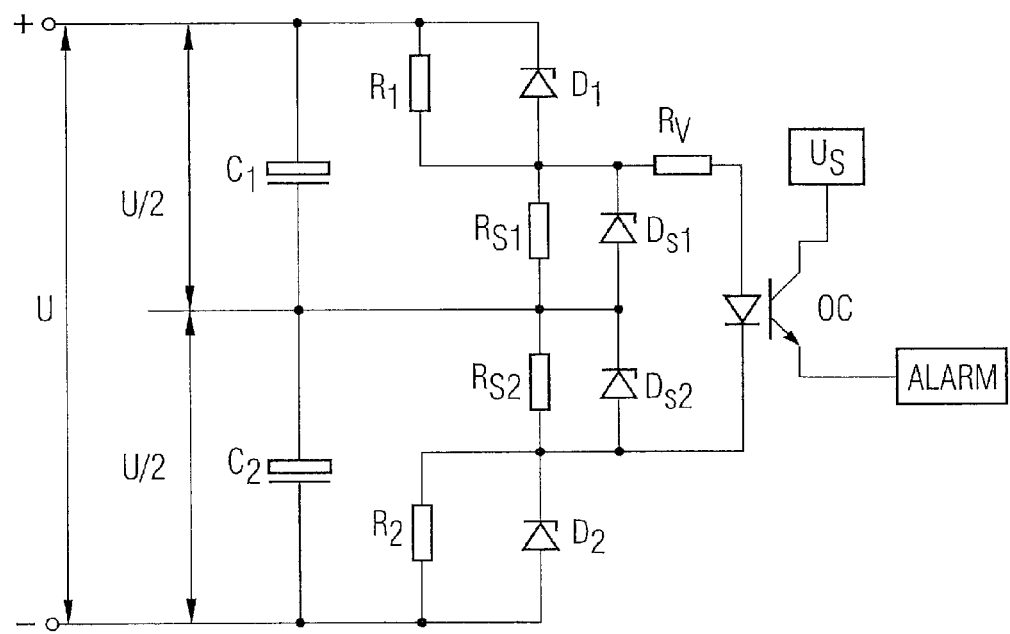
FIG. 3 shows a circuit arrangement with two capacitors arranged in series and one coupling element

If only two capacitors $C_1, C_2$ are connected in series, a different inventive embodiment is also expedient. Such an alternative circuit arrangement is shown in FIG. 3. In this arrangement the series resistances $R_{S1}, R_{S2}$ are elements of the voltage divider for dividing the initially present voltage U between the two capacitors $C_1, C_2$. The voltage divider is then made up of a first series circuit, consisting of a first resistance $R_1$ and a first series resistance $R_{S1}$, and a second series circuit consisting of a second resistance $R_2$ and a second series resistance $R_{S2}$. The first series circuit is connected parallel to the first capacitor $C_1$ and the second series circuit is connected parallel to the second capacitor $C_2$.

The following applies for the resistances $R_1, R_2, R_{S1}, R_{S2}$:

$$(R_1 + R_{S1}) = (R_2 + R_{S2})$$

The voltage U is then divided evenly between the two capacitors $C_1, C_2$. Arranged parallel to each series resistance $R_{S1}, R_{S2}$ again is a Zener diode $D_{S1}, D_{S2}$ to protect against overvoltages in the protective circuit. The two Zener diodes $D_{S1}, D_{S2}$ here form a series circuit to which a coupling element OC with a pre-resistance $R_V$ is connected in parallel.

Figure 4:
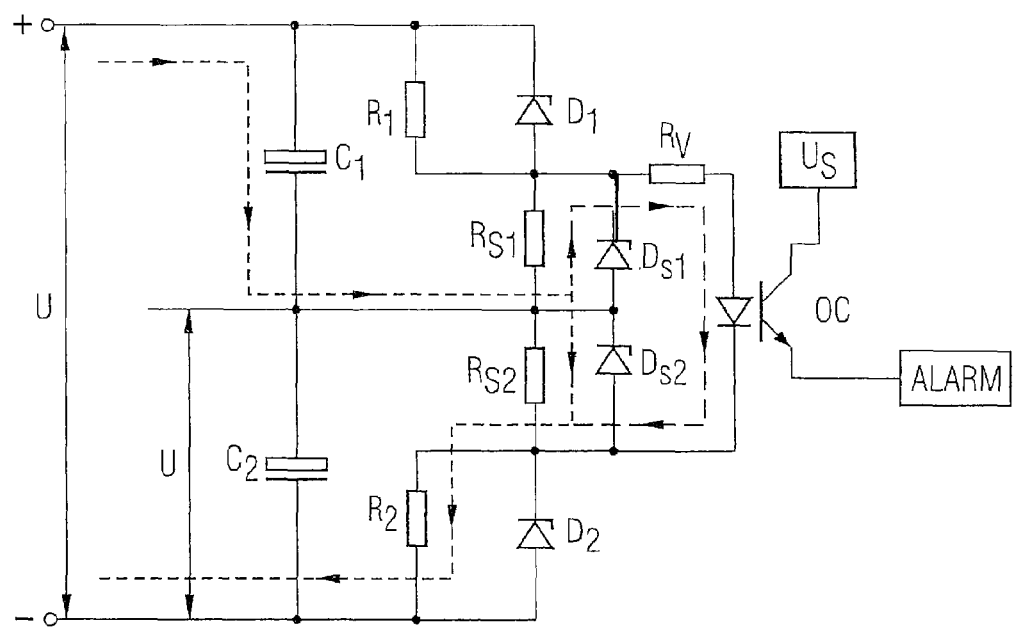
FIG. 4 shows a circuit arrangement according to FIG. 3 with a current flow with a shorted first capacitor
Figure 5:
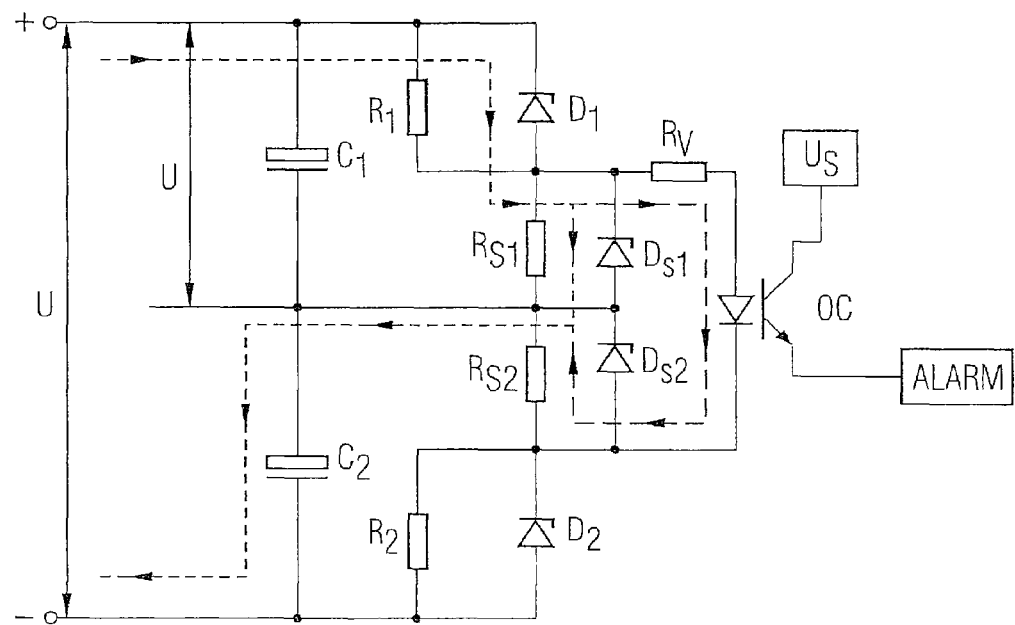
FIG. 5 shows a circuit arrangement according to FIG. 3 with a current flow with a shorted second capacitor.

The current flows when a capacitor $C_1$, $C_2$ short circuits are shown in FIGS. 4 and 5. The short circuit of the first capacitor 1 shown in FIG. 4 brings about a current flow from the positive pole of the voltage U through the first capacitor $C_1$, with the result that the entire voltage U is present at the second capacitor $C_2$. The entire voltage U is thus also present at the series circuit made up of the second resistance $R_2$ and the second series resistance $R_{S2}$. This series circuit divides the voltage U between the second protective diode $D_2$ and the second Zener diode $D_{S2}$ or the elements of the protective circuit $D_{S1}$, $R_V$, OC arranged parallel thereto. In this process the threshold voltage of the second protective diode $D_2$ is exceeded, with the result that it becomes conducting. The current therefore flows by way of the conducting second protective diode $D_2$ to the negative pole of the voltage U initially present. The voltage present at the second series resistance $R_{S2}$ brings about a current flow through the protective circuit, i.e. through the first Zener diode $D_{S1}$, the pre-resistance $R_V$ and the transmit part of the coupling element OC. This current flow is determined here by the second Zener diode $D_{S2}$ connected parallel to the second series resistance $R_{S2}$.

As soon as a current flows through the protective circuit, the alma circuit is activated by way of the coupling element OC and the capacitors $C_1$, $C_2$ are separated by means of the facility ALARM to isolate them from the voltage U initially present. This happens such that the facility ALARM is connected to the auxiliary voltage $U_S$ by means of the receiver part of the coupling element OC.

FIG. 5 shows the current flow when the second capacitor $C_2$ shorts. In this instance the entire voltage U is present at the first capacitor $C_1$, resulting in the breakdown of the first protective diode $D_1$. A current once again flows through the protective circuit and brings about the isolation of the capacitors, thereby preventing them from being damaged.

Once the fault causing a short circuit of a capacitor $C_1$ or $C_2$ has been eliminated, the circuit can be brought back into operation.

The invention claimed is:
1. A circuit arrangement, comprising:
at least two capacitors;
a first voltage;
a protective diode;
a series resistance;
a protective circuit, the protective circuit including a coupling element, the coupling element including a transmit part and a receiver part, wherein the coupling element couples the series resistance to an alarm circuit; and
a pre-resistance is connected upstream of the transmit part of the coupling element,
wherein the protective circuit in series with the pre-resistance is disposed in parallel with the series resistance,
wherein the at least two capacitors are connected in series, across which series connection of the at least two capacitors defines the first voltage,
wherein a voltage divider is arranged parallel to the at least two capacitors, which divides the first voltage between the at least two capacitors,
wherein a protective diode in series with a series resistance is arranged parallel to each capacitor,
wherein during fault-free operation whereby the capacitors are working properly without a short circuit; no voltage is present at the series resistance and a threshold voltage of the protective diode is lower than a permissible voltage of the capacitor arranged parallel to the protective diode and the series resistance,
wherein in the event of a fault whereby at least one of the capacitors includes a short circuit;
a second voltage present at the series resistance triggers an activation of the alarm circuit.

2. The circuit arrangement as claimed in claim 1, wherein the alarm circuit comprises a facility for isolating the at least two capacitors from the first voltage, and
wherein the facility for isolating the at least two capacitors is connected in series with the receiver part of the coupling element connected to an auxiliary voltage.

3. The circuit arrangement as claimed in claim 2, wherein a plurality of coupling elements are provided, and
wherein a plurality of receiver parts of the plurality of coupling elements are connected in parallel, and
wherein a resulting parallel circuit of the plurality of receiver parts connected in series with the isolating facility is connected to the auxiliary voltage.

4. The circuit arrangement as claimed in claim 3, wherein the isolating facility is configured as a switching element at an input of the circuit arrangement.

5. The circuit arrangement as claimed in claim 3,
wherein a resistance is arranged parallel to each capacitor,
wherein a series circuit including the protective diode and the series resistance is connected parallel to each resistance, and
wherein the transmit part of the coupling element is arranged parallel to each series resistance.

6. The circuit arrangement as claimed in claim 1,
wherein a resistance is arranged parallel to each capacitor,
wherein a series circuit including the protective diode and the series resistance is connected parallel to each resistance, and
wherein a transmit part of a coupling element is arranged parallel to each series resistance.

7. The circuit arrangement as claimed in claim 6,
wherein a Zener diode is arranged parallel to each series resistance, and
A wherein the Zener diode protects the transmit part of a coupling element.

8. The circuit arrangement as claimed in claim 1,
wherein a Zener diode is arranged parallel to each series resistance, and
wherein the Zener diode protects the transmit part of a coupling element.

9. The circuit arrangement as claimed in claim 1, wherein the protective diode is configured as a suppressor diode.

10. The circuit arrangement as claimed in claim 1, wherein the coupling element is configured as an optical coupler.

11. A circuit arrangement, comprising:
a first capacitor connected in series with a second capacitor, across which series connection of the at least two capacitors defines a first voltage,
wherein the first capacitor is parallel to a first resistance arranged in series with a first series resistance,
wherein parallel to the second capacitor a second resistance is arranged in series with a second series resistance,
wherein a first protective diode is arranged parallel to the first resistance,
wherein a second protective diode is arranged parallel to the second resistance, and
wherein a transmit part of a coupling element is arranged parallel to a series circuit formed from the first series resistance and the second series resistance,
wherein a protective circuit includes the coupling element, the coupling element including the transmit part and a receiver part, wherein the coupling element couples the first and second series resistances to an alarm circuit, wherein a pre-resistance is connected upstream of the transmit part of the coupling element, wherein the protective circuit in series with the pre-resistance is disposed parallel to the first and second series resistances, and wherein in the event of a fault whereby at least one of the capacitors includes a short circuit;

a second voltage present at the first and second series resistances triggers an activation of the alarm circuit.

12. The circuit arrangement as claimed in claim 11, wherein a Zener diode is arranged parallel to each series resistance, and wherein the Zener diode protects the transmit part of the coupling element.

13. The circuit arrangement as claimed in claim 11, wherein the protective diode is configured as a suppressor diode.

14. The circuit arrangement as claimed in claim 11, wherein the coupling element is configured as an optical coupler.

\* \* \* \* \*